United States Patent
Wilson et al.

(10) Patent No.: US 11,861,577 B2
(45) Date of Patent: Jan. 2, 2024

(54) SYSTEM AND METHOD FOR DISTRIBUTED ENFORCEMENT OF CONFIGURATION LIMITATIONS

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 17/570,586

(22) Filed: Jan. 7, 2022

(65) Prior Publication Data

US 2023/0222469 A1     Jul. 13, 2023

(51) Int. Cl.
*G06F 15/16*   (2006.01)
*G06Q 20/12*   (2012.01)
*G06F 9/50*    (2006.01)
*H04L 67/00*   (2022.01)

(52) U.S. Cl.
CPC ......... *G06Q 20/127* (2013.01); *G06F 9/5077* (2013.01); *H04L 67/34* (2013.01)

(58) Field of Classification Search
CPC .................................................. G06F 9/5077
See application file for complete search history.

(56) References Cited

U.S. PATENT DOCUMENTS

| | | | |
|---|---|---|---|
| 6,317,815 B1 | 11/2001 | Mayer et al. | |
| 9,178,948 B2 | 11/2015 | Chen et al. | |
| 9,705,995 B2 * | 7/2017 | Edlund | H04L 67/51 |
| 10,044,522 B1 * | 8/2018 | Shamis | H04L 41/0893 |
| 2003/0131028 A1 * | 7/2003 | Radi | H04L 41/5061 |
| 2005/0182843 A1 * | 8/2005 | Reistad | H04L 43/0817 709/229 |
| 2006/0010477 A1 * | 1/2006 | Yu | H04N 21/25841 348/E7.071 |

(Continued)

OTHER PUBLICATIONS

Souvik Chakravarty (2019). Arm System Control Processor (SCP) Firmware-101. Linaro. https://static.linaro.org/connect/san19/presentations/san19-117.pdf.

(Continued)

*Primary Examiner* — Hieu T Hoang
(74) *Attorney, Agent, or Firm* — Womble Bond Dickinson (US) LLP

(57) ABSTRACT

Methods, systems, and devices for providing for providing computer implemented services using managed systems are disclosed. To improve the likelihood of the computer implemented services being provided, a subscription based model may be used to manage the managed systems. The subscription model may utilize a highly accessible service to obtain information regarding capabilities of managed systems to present information regarding all potential solutions that the managed systems may provide. In some cases, subscription decisions may be based on inaccurate information. To reduce the impact of such decisions, entities that are more likely to have access to accurate information may elect to honor or reject subscription decisions made by entities that are more likely to have access to inaccurate information.

20 Claims, 10 Drawing Sheets

(56) References Cited

U.S. PATENT DOCUMENTS

| | | |
|---|---|---|
| 2008/0235784 A1* | 9/2008 | Basner .................. H04L 63/083 |
| | | 726/12 |
| 2008/0256641 A1 | 10/2008 | Lo |
| 2012/0005649 A1 | 1/2012 | Lavin |
| 2012/0311673 A1 | 12/2012 | Sodah |
| 2013/0339306 A1 | 12/2013 | Kim et al. |
| 2015/0005033 A1 | 1/2015 | Petersson et al. |
| 2015/0271276 A1 | 9/2015 | Edlund et al. |
| 2015/0373012 A1 | 12/2015 | Bartz et al. |
| 2016/0150396 A1 | 5/2016 | Milhizer |
| 2017/0006119 A1* | 1/2017 | Pogrebinsky ......... G06F 3/0482 |
| 2017/0048713 A1* | 2/2017 | Guday .................. H04W 12/35 |
| 2017/0090912 A1 | 3/2017 | Fuglsang et al. |
| 2017/0244783 A1 | 8/2017 | Maresca |
| 2017/0359356 A1 | 12/2017 | Brandwine |
| 2021/0067406 A1 | 3/2021 | Myers et al. |
| 2021/0160255 A1 | 5/2021 | Cherkas et al. |
| 2021/0360074 A1 | 11/2021 | Long |
| 2023/0171586 A1 | 6/2023 | Holmes |

OTHER PUBLICATIONS

"What Is a SmartNIC?," Web page <hhttps://blogs.nvidia.com/blog/2021/10/29/what-is-a-smartnic/https://blogs.nvidia.com/blog/2021/10/29/what-is-a-smartnic/>, 1 page, Oct. 29, 2021, retrieved from Internet Archive Wayback Machine <http://web.archive.org/web/20211209195130/https://blogs.nvidia.com/blog/2021/10/29/what-is-a-smartnic/> on Jan. 20, 2022.

* cited by examiner

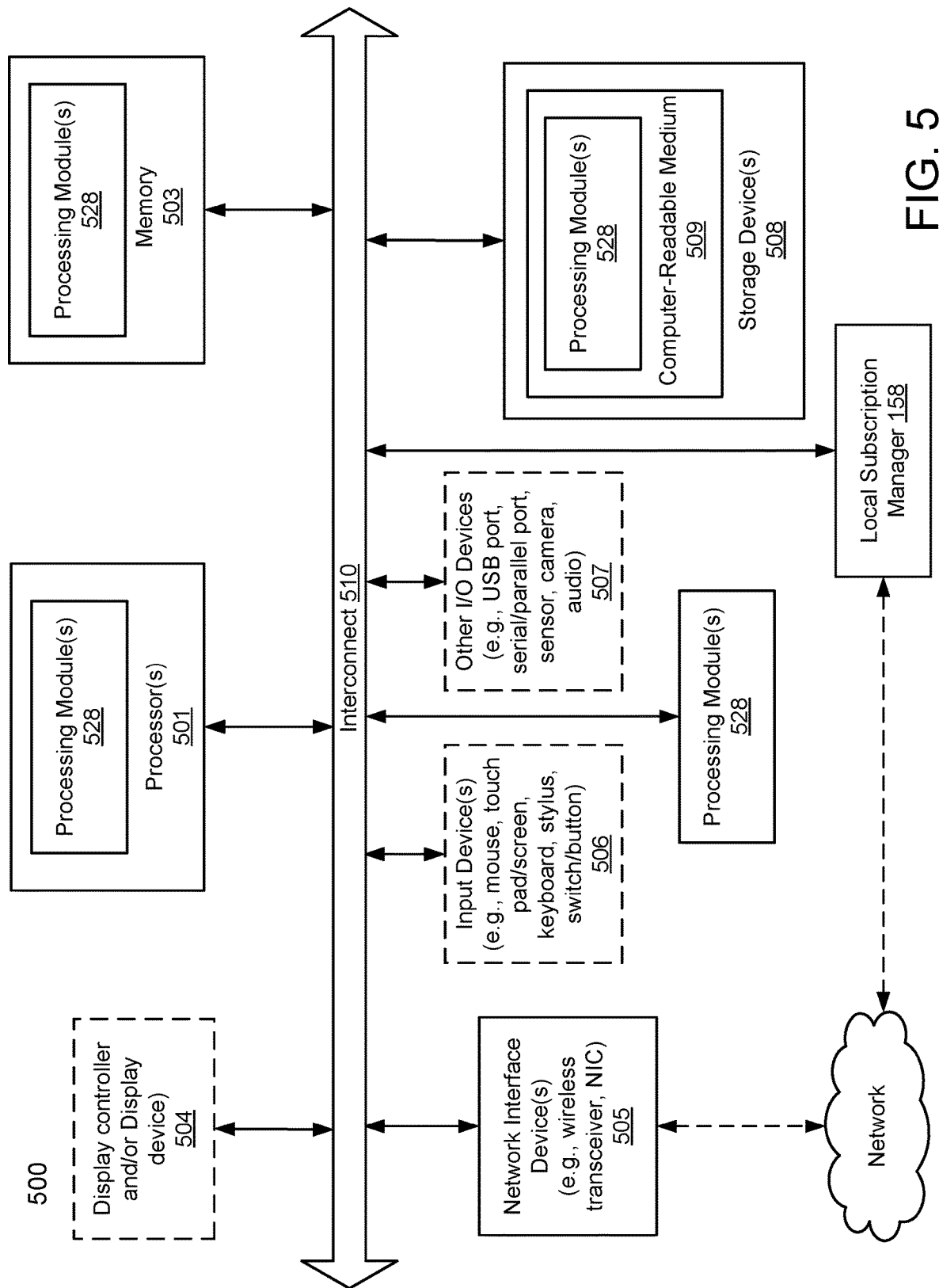

SYSTEM AND METHOD FOR DISTRIBUTED ENFORCEMENT OF CONFIGURATION LIMITATIONS

FIELD DISCLOSED HEREIN

Embodiments disclosed herein relate generally to system management. More particularly, embodiments disclosed herein relate to systems and methods to manage configuration of components of a distributed system.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

FIG. 5 shows a block diagram illustrating a computing device in accordance with an embodiment.

DETAILED DESCRIPTION

Figure 1A:
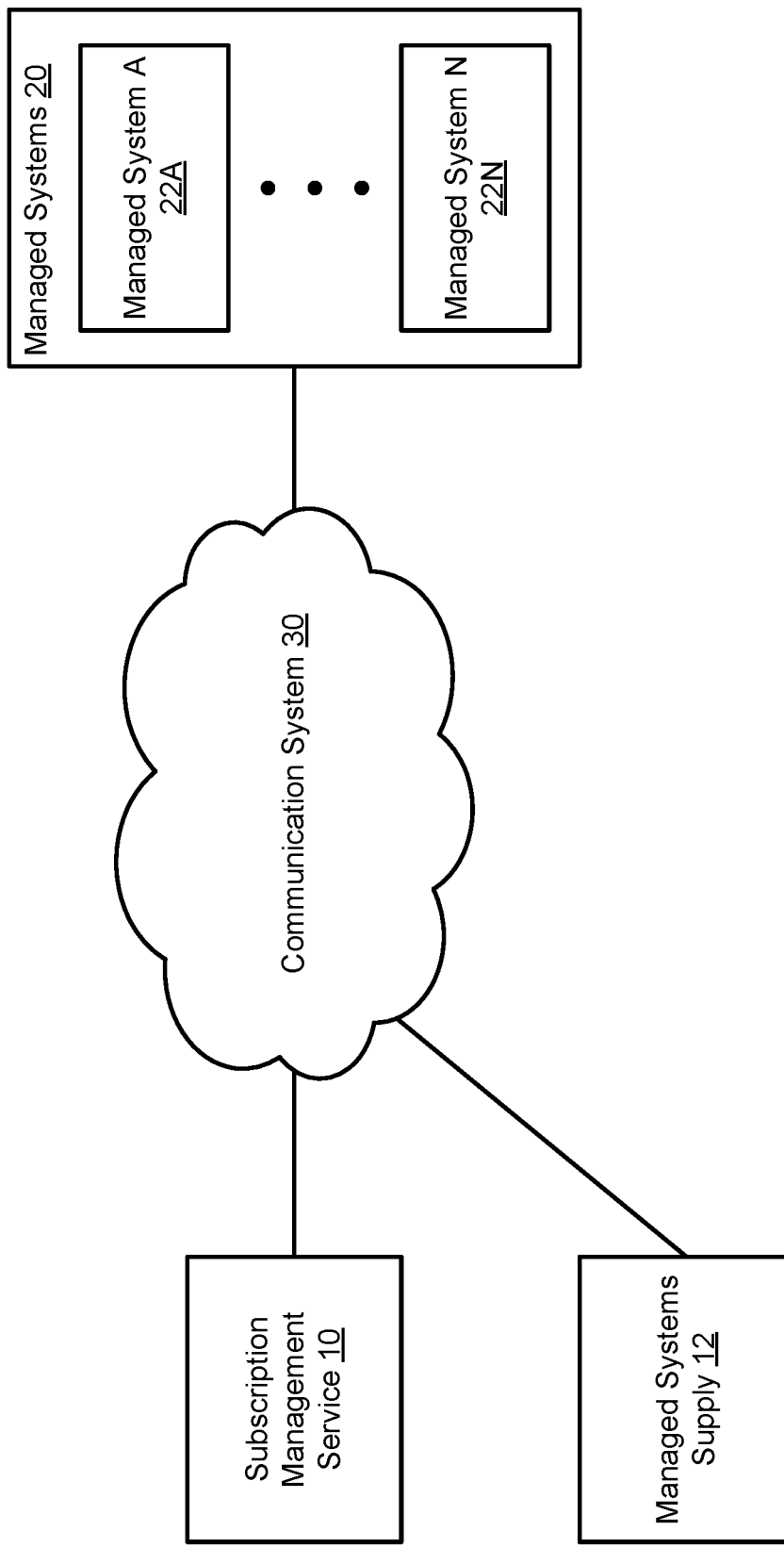
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources and also software resources such as drivers, firmware, etc. to provide the desired computer implemented services. Different computer implemented services may have different hardware and/or software resources needs. An aggregation of different types of computer implemented services may need to be provided so that corresponding solutions may be provided.

To improve the likelihood of the computer implemented services being provided, embodiments disclosed here relate to methods and systems for managing managed systems using a subscription based model. The subscription model may utilize a highly accessible service to obtain information regarding capabilities (e.g., hardware resources) of managed systems to present information regarding all potential solutions that the managed systems may provide.

By presenting users with such information, the users may not need to be well versed in the underlying hardware and software components necessary for the solutions to be provided. Further, as the hardware components of a managed system are changed over time, the compatible solutions may be continuously updated so that users may be continuously appraised of all possible solutions that may be provided using the managed systems.

By having access to this information, users may make better informed decisions regarding which solutions should be implemented by managed systems. Further, by continuously updating the compatible solutions presented to users, the cognitive burden on the users may be greatly reduced as the hardware components of the managed systems change over time. Additionally, by virtue of this selection approach, deployment of various components for incompatible solutions may be avoided thereby preventing impairments of the managed systems.

However, by virtue of its distributed nature, not all components of the distributed system may have access to accurate information. Consequently, some subscription decisions made for various managed systems may not actually be compatible with the managed systems. If implemented, such changes in subscriptions may negatively impact the computer implemented services provided by the distributed system.

To limit the potential impact of subscription decisions made based on inaccurate information, a system in accordance with embodiments disclosed herein may operate using a distributed control and management model where the entities most closely related to or likely to have accurate information is empowered to honor or reject subscription decisions made by other entities. By distributing command and control across the distributed system, the impacts of inaccurate information may be reduced by providing the entity that is most likely to have accurate information to modify previously made decisions (e.g., through rejection or adoption).

Thus, embodiments disclosed herein may address the challenge of information distribution in a distributed system. For example, rather than attempting to ensure that all information on which decisions is based is accurate (which may incur an unreasonable amount of computational overhead), the disclosed system may allow for undesirable decisions to be made but subsequently corrected when contradictory, but likely more accurate, data is used to further evaluate the previously made decisions. Consequently, the overhead for data distribution and consistency may be reduced while still ensuring that decisions consistent with the most accurate data in the distributed system are honored and enforced.

In an embodiment, a computer-implemented method for managing computer implemented services provided by a managed system is provided. The method may include obtaining, by a local subscription manager of the managed system, a subscription update for the managed system, the subscription update specifying a change in subscription for the managed system; making a determination, by the local subscription manager, that the subscription update implicates an incompatible configuration for the managed system, the incompatible configuration requiring a function which the managed system is unable to provide; in response to the determination: rejecting, by the local subscription manager, the subscription update for the managed system to maintain a current configuration of the managed system.

Making the determination may include performing a lookup in a configurations compatibility repository using one or more subscriptions specified in the subscription updates as keys to identify that at least one of the one or more subscriptions is not associated with any compatible configuration specified by the configurations compatibility repository. The configuration compatibility repository may include a list, the list may include a number of entries with each entry of the number of entries being associated with a corresponding subscription, and the lookup being performed by attempting to match the one or more subscriptions to the corresponding subscription of each of the number of entries.

The entries of the number of entries of the list may be based on hardware resources of the managed system, the hardware resources limiting subscriptions which may be implemented with the managed system.

The computer-implemented method may also include obtaining, by the local subscription manager, a second subscription update for the managed system, the second subscription update specifying a second change in subscription for the managed system; making a second determination, by the local subscription manager, that the second subscription update implicates a compatible configuration for the managed system; in response to the determination: updating, by the locally subscription manager, locally maintained subscription information based on the subscription update; and enforcing, by the local subscription manager, the updated locally maintained subscription information on the managed system.

Enforcing the updated locally maintained subscription information on the managed system may include disabling a portion of hardware resources of the managed system that are enabled.

Enforcing the updated locally maintained subscription information on the managed system may include enabling a portion of hardware resources of the managed system that are disabled.

Enforcing the updated locally maintained subscription information on the managed system may include updating operation of a startup manager hosted by the managed system; updating operation of an operation manager hosted by the managed system; and/or updating operation of a software stack hosted by the managed system.

The determination may be made, at least in part, on a portion of hardware resources of the managed system that will be disabled if the one or more subscriptions are implemented by the managed system.

The determination may be made, at least in part, on a software stack functionality of the managed system that will be unavailable if the one or more subscriptions are implemented by the managed system.

The local subscription manager may include an out of band manager hosted by the managed system and that operates independently from the managed system.

The local subscription manager may make the determination while unable to communicate with other components of a distributed control plane for the managed system.

The local subscription manager may present itself as a separate device from the managed system.

The local subscription manager may be associated with a network endpoint different from a second network endpoint associated with the managed system.

A non-transitory media may include instructions that when executed by a processor cause the computer-implemented method to be performed.

A managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices (e.g., data processing systems) that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services. Changes in the hardware and/or software components may provide for various types of different computer implemented services to be provided over time.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
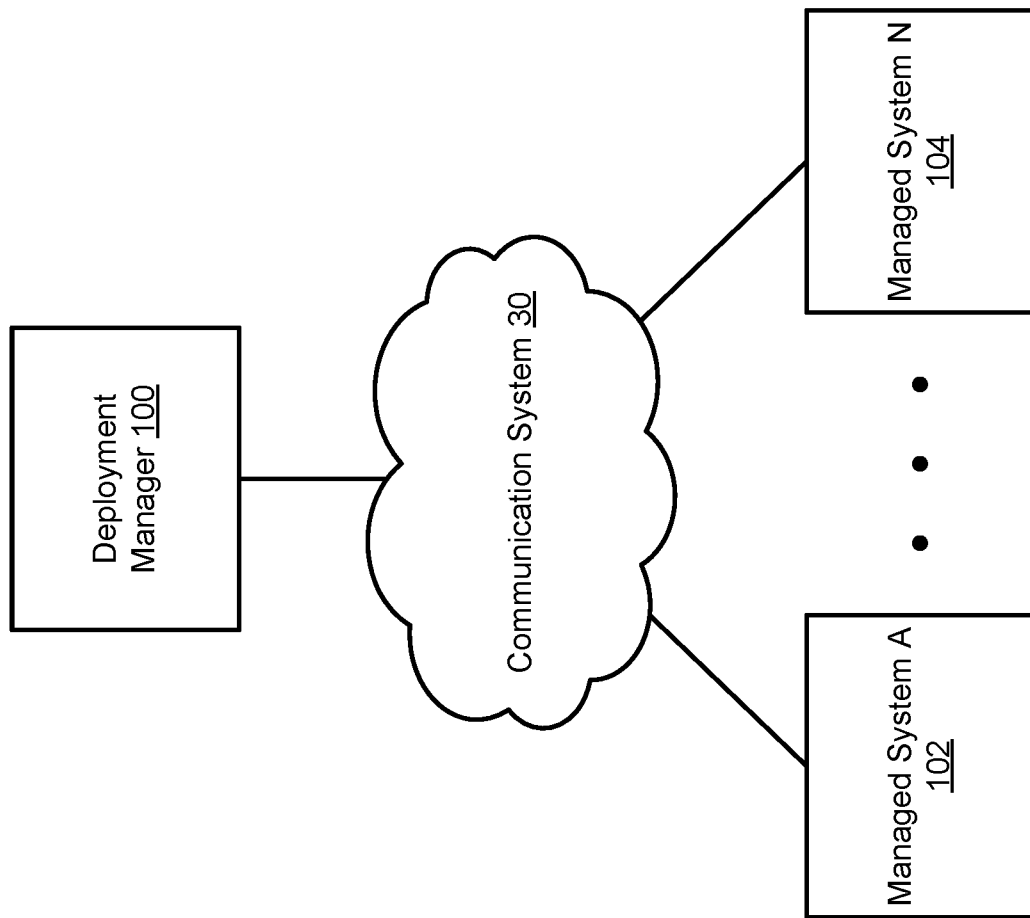
FIG. 1B shows a block diagram illustrating a deployment in accordance with an embodiment.
Figure 1C:
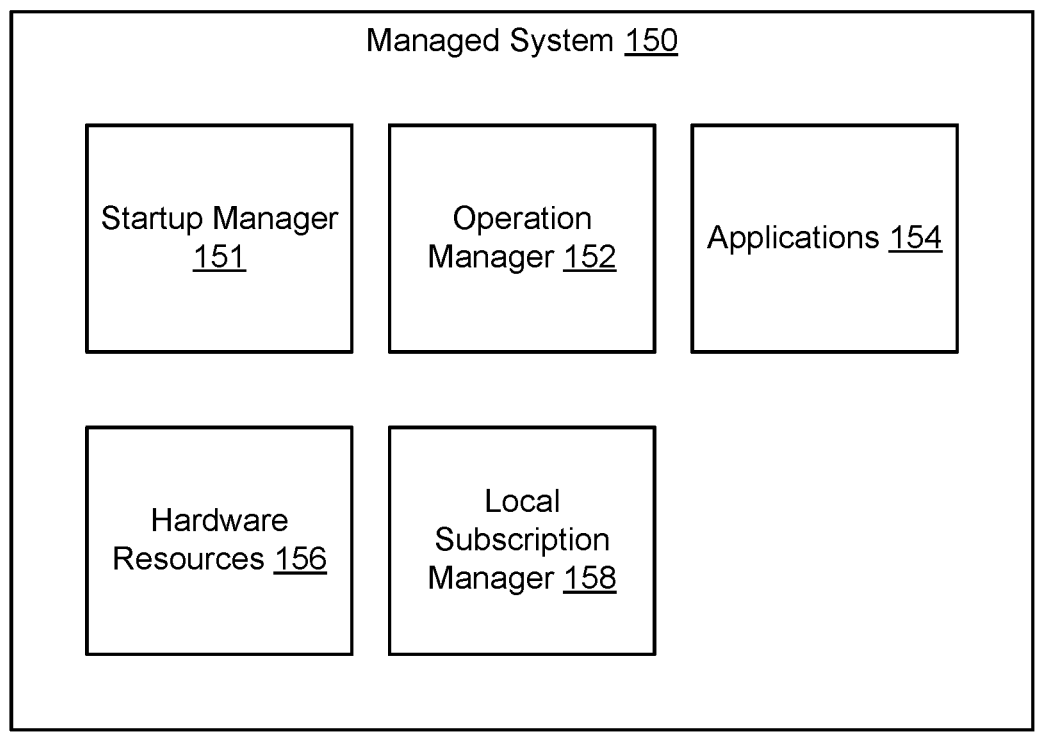
FIG. 1C shows a block diagram illustrating a managed system in accordance with an embodiment.

To provide the aforementioned computer implemented services, any of the managed systems 22A, 22N may need to operate in a predetermined manner. For example, certain hardware components may need to be operational and/or certain software components may need to be operating for the managed systems to provide computer implemented services (e.g., to operate as a solution). Different configurations of the hardware components, software components, and/or applications may need to be implemented by managed systems 20 depending on the computer implemented services desired to be provided by the respective managed systems. Refer to FIG. 1C for additional details regarding managed systems 20.

Additionally, any number of the managed system may operate (e.g., as part of a deployment) to provide various computer implemented services independently or cooperatively with other such managed systems. In such scenarios, the operation of a group of managed system may be managed by a local control plane for those managed systems. Refer to FIG. 1B for additional details regarding groups of managed systems.

However, to provide desired computer implemented services, as noted above, a managed system may need to have certain capabilities. For some capabilities, such as those that are provided by software components, a lack of the capability may be remediated by deploying appropriate software components (which may assume that certain hardware components necessary for operation of the software components are available). However, some capabilities may require certain hardware components to be present in a managed system.

For example, in a data storage scenario, a managed system may need to include a hardware storage controller for certain storage functionalities to be provided. In another example, a managed system may need to include a graphics processing unit, application specific integrated circuit, or other type of special purpose hardware device to provide other types of functionalities. In a further example, a managed system may need to include minimum quantities and/or types of general computing components such as processors, memory modules, storage devices, etc. for other types of functionalities to be provided.

If a managed system is instructed to perform various functionalities which is unable to provide, then the managed system may not provide the functionalities. Further, if operating in cooperation with other managed systems to provide various functionalities, a failure in the ability of the managed system to provide specified functionalities may impact the ability of all of the managed systems to provide desired functionalities. Thus, if capabilities of managed systems are not carefully considered when making configuration decision, the resulting configured managed systems may be unable to provide or may only provide impaired (to some extent) desired computer implemented services.

In general, embodiments disclosed herein relate to system, devices and methods for managing one or more managed systems in a manner that may improve the likelihood of the managed system being able to provide desired computer implemented services over time. To do so, a system in accordance with embodiments disclosed herein may provide a distributed system for automatically identifying and implementing hardware and/or software configurations of managed systems (e.g., to provide an integrated solution). The distributed system may automatically perform processes for discovering capabilities of managed systems and ensure that only configurations compatible with the capabilities of the managed systems are enforced on the managed systems.

To limit the possibility of incompatible configurations being pushed to the managed systems for deployment, a subscription management service of update itself regarding the capabilities of the managed systems, and take into account the capabilities and limitations thereof. However, by virtue of the distributed nature of such systems, in some scenarios, the subscription management service may make configuration decisions for the managed systems using outdated or incorrect information. Consequently, the managed systems may be subject to attempt to reconfigure them in a manner that is inconsistent with their actual capabilities.

To further limit the possibility for incompatible configurations being employed by managed systems, local subscription managers hosted by the managed systems my independently decide whether and/or to what extent requests for changes in configuration of the managed systems should be honored or rejected. The local subscriptions managers may make such decisions dynamically to ensure that the actual capabilities of the managed systems are taken into account when deciding whether to honor a change in configuration.

To manage configuration of the managed systems, a subscription based model may be utilized. The subscription based model may allow a person to select a desired functionality. Based on the selection, configurations (e.g., functionality subscription) for various managed systems may be selected and distributed for enforcement. The configurations may specify any number of enablement/disablements for hardware and software components, as well as any number of configurations for the hardware and/or software components. These functionality subscriptions may be distributed to local subscription managers hosted by corresponding managed systems. The local subscription managers may enforce the functionality subscriptions on the host managed system, so long as the functionality subscriptions are compatible with the actual capabilities of the host managed system.

By doing so, embodiments disclosed herein may (i) reduce the cognitive burden for selecting and managing systems to provide desired computer implemented services, (ii) may improve the quality of computer implemented services by ensuring that that capabilities of the managed systems are known, and/or (iii) facilitating subscription management in the distributed system to remediate the potential for inaccurate information being used as a basis for configuration decisions.

To provide the above noted functionality, a system in accordance with an embodiment may include subscription management service 10. Subscription management service 10 may facilitate (i) selection and procurement of managed system to a client site (e.g., a deployment location), and (ii) automatic configuration of managed systems 20 to provide an integrated solution and/or different solutions over time. To do so, subscription management service 10 may (i) obtain information indicating desired functions of one or more of managed systems 20, (ii) select and deploy one or more managed systems 20 to a client site (e.g., which may be stored in managed systems supply 12 prior to deployment), (iii) track changes in the solution compatibilities of managed systems 20 over time, and (iv) use the tracked changes in solution capabilities to select and deploy changes in solutions provided by managed systems 20. To deploy a new solution, a software stack (e.g., operating system, applications, drivers, etc.) may be instantiated on the managed system. However, various software stacks may have requirements regarding hardware resources necessary for operation of the software stacks. The tracked changes in the solution capabilities may be used to restrict (e.g., from deployment) software stacks that may be impaired (e.g., entirely or partially) when deployed to a managed system and allow other software stacks that may be unlikely to be impaired when deployed to the managed systems.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities than those required to immediately address a request from the requesting entity. The selection may be made on the basis that the requesting entity may be likely to request additional features and/or capabilities in the future. Consequently, managed systems 20, when deployed to a client site (e.g., private or shared datacenter), may include sufficient hardware components to address a range of different use cases and solution, beyond those that may be immediately apparent to a requesting entity. The additional capabilities (e.g., various hardware resources) may take the form of, for example, additional processors, memory modules, storage devices, graphical processing units, network interface devices, and/or other types of hardware components. Likewise, compatibility with various types of software components may be taken into account such that a range of different software components may be dynamically deployed to managed systems 20 over time (e.g., based on changing uses of managed systems 20). However, over time the hardware resources of the managed systems may change thereby changing the compatibility of managed systems with various solutions over time.

The distributed system may allow a provider of managed systems 20 to selectively manage various functionalities provided by managed systems 20. For example, the distributed system may allow for different solutions to be provided by managed systems 20 over time. By doing so, a provider of managed systems 20 may tailor the functions provided by managed systems 20 (e.g., from all possible functions) to only those requested, desired, and/or procured by an operator, manager, and/or user of managed systems 20. Doing so may allow for cost controls for various solutions to be put in place by a user of a managed system.

For example, consider a scenario where a provider of a managed system does so on a contractual basis where a user of the managed system agrees to purchase subscriptions for various functionalities, hardware components, and/or software components (e.g., the aggregate being solutions). The user may use subscription management service 10 to select to which of the aforementioned solutions the user wishes to have enabled, to the extent of such enablement, durations of enablement, etc. After an initial selection leading to deployment of managed systems 20, the user may modify their subscription to allow for other solutions to be provided by managed systems 20. In response, subscription management service 10 may cooperate with local subscription managers hosted by managed systems 20 to reconfigure the operation of managed systems 20 to allow these additional features to be utilized by the users. However, by virtue of the nature of the distributed system, subscription management service 10 may not have access to accurate capability information for various managed systems. Consequently, subscription management service may make configuration decisions not based on accurate information. To address such configuration decisions, as discussed below, local subscription managers may automatically take action contrary to requests received from subscription management service 10. By doing so, embodiments disclosed herein may automatically reduce the impact of inaccurate information on the operation of the distribute system.

To allow for users or other persons associated with managed systems to elect into such subscriptions, subscription management service 10 may provide graphical user interfaces that allow such selections to be made. The graphical user interfaces may be implemented, for example, as webpages (or other types of interfaces) accessible to the users or other persons via other devices (e.g., client/user devices not illustrated in FIG. 1A but may be operably connected to subscription management service 10 via communication system 30). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service. In some cases, the local subscription managers may reject the modifications in operation of managed systems 20, which may prompt subscription management service 10 to reconsider its configuration decisions for managed systems 20.

To facilitate solution selection, the graphical user interfaces presented to the users may present solutions that are compatibility with managed systems 20. The presented solutions may be based on a current configuration and/or capabilities of managed systems 20. Accordingly, the persons tasked with managed systems may not need to be aware of the current configuration of managed systems 20 to identify which solutions the managed systems may provide.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information). Consequently, user access to solutions provided by managed systems may be automatically revoked by the managed systems thereby facilitating distributed management of the managed systems that does not rely on or require communication with other entities.

Any of subscription management service 10, managed systems supply 12, and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

In an embodiment, one or more of subscription management service 10, managed systems supply 12, and managed systems 20 are operably connected via communication system 30. Communication system 30 may allow any of subscription management service 10, managed systems supply 12, and managed systems 20 to communicate with one another (and/or with other devices not illustrated in FIG.

1A). To provide its functionality, communication system 30 may be implemented with one or more wired and/or wireless networks. Any of these networks may be a private network (e.g., the "Network" shown in FIG. 5), a public network, and/or may include the Internet. For example, managed systems 20 may be operably connected to subscription management service 10 via the Internet. Subscription management service 10, managed systems supply 12, managed systems 20, and/or communication system 30 may be adapted to perform one or more protocols for communicating via communication system 30.

While illustrated in FIG. 1 with a limited number of specific components, a system may include additional, fewer, and/or different components without departing from embodiments disclosed herein.

Turning to FIG. 1B, a block diagram illustrating a deployment including managed systems 102, 104 in accordance with an embodiment is shown. Like named components in FIGS. 1A-1B may be similar.

The deployment may provide any number and type of computer implemented services. The deployment may be located, for example, at a user selected site, a data center, or another location. The deployment may provide various solutions to users of, for example, an organization on a contractual basis. For example, the organization may agree to pay fees for the solutions provided by the deployment. The solutions may include any number and type of computer implemented services provided by any number of managed systems 102, 104.

The deployment may include deployment manager 100. Deployment manager 100 may locally manage any number of managed systems. For example, the subscription management service may provide information to deployment manager 100 which may in turn manage managed systems 102, 104 based on the information.

To facilitate management, deployment manager 100 may (i) host various software images to facilitate deployment of software necessary for various solutions for managed systems 102, 104, (ii) facilitate identification of solutions compatible with managed systems 102, 104, (iii) provide information regarding the compatible solutions to other entities (e.g., such as the subscription management service), and/or (iv) provide other management functionalities. However, like the subscription management service, deployment manager 100 may operate with inaccurate information regarding the capabilities and/or configurations of managed systems 102, 104. Consequently, the information that it may provide subscription management service 10 may also be inaccurate.

Deployment manager 100 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

Turning to FIG. 1C, a block diagram illustrating managed system 150 in accordance with an embodiment is shown. Managed system 150 may be similar to any of managed systems 20 shown in FIGS. 1A-1B. Managed system 150 may provide desired computer implemented service by allowing for its automatic reconfiguration over time based on subscriptions maintained by subscription management service 10, shown in FIG. 1A. When reconfigured, managed system 150 may provide a solution which may be provided with a software stack hosted by managed system 150. Managed system 150 may be reconfigured by, for example, deploying different software stacks, startup management entities, configuration of the operation of hardware/software components, and/or enabling/disabling hardware components.

In addition (and/or alternatively) to any of the components shown in FIG. 5, managed system 150 may include startup manager 151, operation manager 152, applications 154, hardware resources 156, and local subscription manager 158. Each of these components is discussed below.

Startup manager 151 may manage placing managed system 150 in an operating state conducive to operation of applications 154. For example, after managed system 150 is power cycled, managed system 150 may not be in a state in which application 154 may operate. To enter the operating state, managed system 150 may perform any number processes such as (i) a power on self-test, (ii) performing an inventory of hardware resources 156, and (iii) beginning execution of and/or handing off operation management of managed system 150 to operation manager 152. Startup manager 151 may be implemented with, for example, a basic input output system (BIOS) or other type of startup management entity.

Operation manager 152 may generally manage operation of the component of managed system 150, except for local subscription manager 158. For example, operation manager 152 may be implemented with an operating system used to manage hardware resources 156 of managed system 150 to facilitate execution of applications 154.

To facilitate dynamic changes in solutions provided by operation manager 152 and/or applications 154, local subscription manager 158 may facilitate automatic deployment of software stacks and/or startup managers to managed system 150. The deployed software stacks may include all, or a portion, of operation manager 152 and applications 154. To ensure that only software stacks compatible with hardware resources 156 are deployed, local subscription manager 158 may maintain current information regarding hardware resources such as the types and quantities of hardware devices of hardware resources 156. Local subscription manager 158 may use the current information to identify compatibility between managed system 150 and various solutions, and enforce solution limitations (e.g., restrict) on managed system 150. Further, local subscription manager 158 may use the current information to determine whether to honor or rejection subscription updates to prevent configurations for the managed system 150 that may impair its operation (or require it to perform various actions that it cannot fulfill) from being enforced on managed system 150.

Applications 154 may provide all, or a portion, of the computer implemented services desired by a user, operator, or other person associated with managed system 150. Applications 154 may utilize hardware resources 156 to provide their respective functionalities. The type and quantity of applications 154 that may be hosted by managed system 150 may depend on hardware resources 156 (e.g., types and quantity of hardware devices).

Operation manager 152 may mediate presentation of hardware resources 156 to applications 154 by, for example, scheduling use, managing discontinuous access, and/or performing other actions to coordinate use of hardware resources 156 by applications 154 (and/or other entities). Consequently, the operation of applications 154 may be predicated on the operation of operation manager 152 as well as capabilities of hardware resources 156.

In an embodiment, one or more of startup manager 151, operation manager 152, and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of startup manager 151, operation manager 152, and applications 154. One or more of startup manager 151, operation manager 152, and applications 154 may be implemented using other types of hardware devices without departing embodiment disclosed herein.

In an embodiment, one or more of startup manager 151, operation manager 152, and applications 154 is implemented using a processor adapted to execute computing code stored on a persistent storage that when executed by the processor performs the functionality of one or more of startup manager 151, operation manager 152, and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of startup manager 151, operation manager 152, applications 154, and/or other entities not shown in FIG. 1C. As part of their respective operation, hardware resources 156 may host firmware and/or may otherwise be programmable to facilitate their respective operation.

Various changes in subscriptions may cause various portions of hardware resources 156 to be enabled or disabled. Consequently, even though physical hardware may be present in managed system 150, some of the physical hardware may not be usable even though it could be usable. Accordingly, information regarding the physical hardware of managed system 150 may not be used to accurately determine the actual capabilities of managed system 150, since any quantity of hardware resources 156 may not actually be usable.

Local subscription manager 158 may provide subscription management services. Subscription management services may include (i) identifying solution compatibilities of managed system 150, and (ii) limiting configuration of managed system 150 based on the configuration compatibilities with the actual capabilities of managed system 150.

By providing its functionality, local subscription manager 158 may manage the configuration, behavior, and/or functionality of managed system 150 in a manner that automatically conforms it to match that expected by subscription management service 10 (e.g., to match those solutions to which managed system 150 is subscribed). For example, when subscription management service 10 attempts to subscribe a managed system to a subscription which requires a configuration that is incompatible with the managed system, local subscription manager 158 may reject the subscription. By virtue of the rejection, subscription management service 10 may learn of the actual capabilities of managed system 150, update its information, and change its configuration decisions such that subsequent subscriptions for managed system 150 are more likely to be compatible with the actual capabilities of managed system 150.

As part of the aforementioned process, local subscription manager 158, subscription management service 10, and/or deployment manager 100 may cooperate to enforce subscriptions on managed system 150. Local subscription manager 158, subscription management service 10, and/or deployment manager 100 may also perform one or more authentications of one another and/or communications from these components to prevent other entities from interfering with the cooperative operation of local subscription manager 158, subscription management service 10, and/or deployment manager 100 for managed system management purposes.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller. The out of band management controller may be hosted by managed system 150, be operably connected to hardware resources 156 (e.g., via interconnect 510, shown in FIG. 5), and may operate independently from other components (e.g., hardware and software) of managed system 150. The management controller may include functionality to manage the operation, configuration, and/or other characteristic of any hardware and/or software component of managed system 150. For example, the management controller may include functionality to load software stacks on managed system, obtain information regarding hardware resources 156, etc.

In an embodiment, the management controller includes a separate communication interface (e.g., from that of a communication interface of managed system 150) through which it communicates with subscription management service 10 and/or deployment manager 100. In an embodiment, the management controller uses the same communication interface which managed system 150 uses to communicate with other devices. Either of these communication interface may facilitate communications with communication system 30, and devices connected to communication system 30 such as subscription management service 10 or deployment manager 100. The management controller may present itself as a separate device to other entities (e.g., which may be associated with its own network endpoint).

Figure 1D:
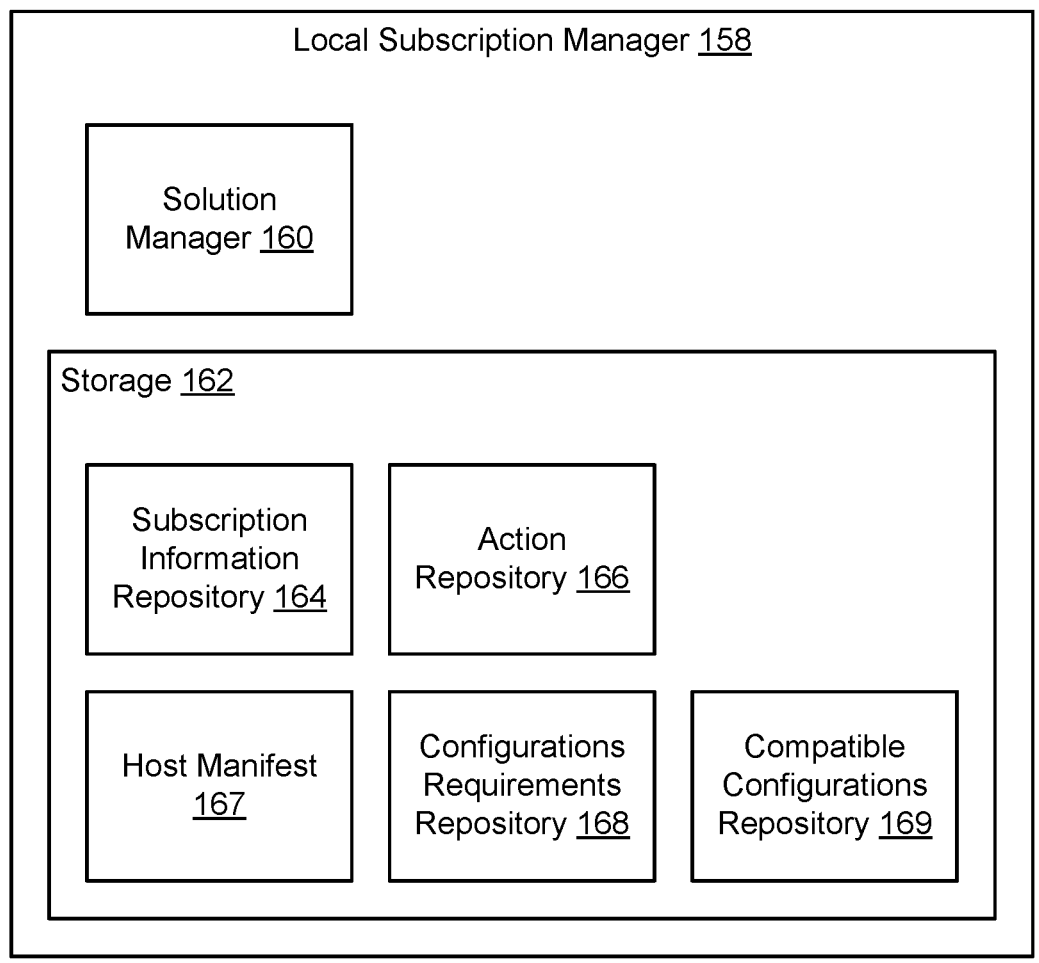
FIG. 1D shows a block diagram illustrating a local subscription manager in accordance with an embodiment.

When providing its functionality, local subscription manager 158 may perform all, or a portion, of the methods and operations illustrated in FIGS. 2-4C. Refer to FIG. 1D for additional details regarding local subscription manager 158.

While illustrated in FIG. 1C with a limited number of specific components, a managed system may include additional, fewer, and/or different components without departing from embodiments disclosed herein.

Turning to FIG. 1D, a block diagram of local subscription manager 158 in accordance with an embodiment is shown. Local subscription manager 158 may be implemented with a computing device similar to that illustrated in FIG. 5. In addition (and/or alternatively) to any of the components shown in FIG. 5, local subscription manager 158 may include solution manager 160 and storage 162. Each of these components is discussed below.

Solution manager 160 may include functionality to (i) obtain information regarding hardware resources of a host managed system, (ii) identify solution (e.g., corresponding configurations) compatibilities of the host managed system based on the hardware resources information and information included in solution requirements repository 168, and (iii) enforce changes in solution compatibilities of the host managed system on the host managed system over time. To enforce the changes in solution compatibilities, solution manager 160 may (i) distribute information regarding the changes in solution compatibilities of the host managed system to other entities to prevent attempts to deploy incompatible software stacks to the host managed system and/or (ii) reject software stack deployment attempts (e.g., or other types of subscription changes) to the host managed system for software stacks that are incompatible with the host managed system. By doing so, a host managed system may be more likely to provide desired computer implemented services by improving the likelihood that a managed system is configured to provide more desirable solutions.

In an embodiment, solution manager 160 is implemented using a hardware device including circuitry. The hardware device may be, for example, a digital signal processor, a field programmable gate array, or an application specific integrated circuit. The circuitry may be adapted to cause the hardware device to perform the functionality of solution manager 160. Solution manager 160 may be implemented using other types of hardware devices without departing embodiment disclosed herein.

In one embodiment, solution manager 160 is implemented using a processor adapted to execute computing code stored on a persistent storage that when executed by the processor performs the functionality of solution manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a device that hosts local subscription manager 158.

Storage 162 may store data structures including subscription information repository 164, action repository 166, host manifest 167, solution requirements repository 168, and compatible solutions repository 169.

Subscription information repository 164 may be implemented with one or more data structures that store information regarding subscriptions for a managed system that hosts local subscription manager 158. The information may include, for example, the subscriptions to be enforced on the host managed system, limitations on the subscriptions (e.g., duration based, use based, etc.), and/or disablement actions for the subscriptions. The disablement actions may be implemented with code blocks that may be pushed to the host managed system for execution. When executed, the host managed system may perform the disablement actions which may, for example, cause various hardware/software components to be enabled/disabled, and/or reconfigured (e.g., through reformatting of storage device, modification of settings, etc.).

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by solution manager 160 when a condition is met, such as a subscription limit being exceeded or a new subscription being obtained.

In an embodiment, action repository 166 includes at least one set of actions keyed to changes in subscription of a management entity for the host managed system. The actions may include (i) restarting/initializing a host managed system, (ii) after doing so, interrupting a normal startup process performed by the host managed system prior to the host managed system booting to a management entity, (iii) while the normal startup process is interrupted, dynamically configuring a management entity, and/or (iv) resuming the normal startup process such that the host managed systems hands off, after startup, operation of the managed system to the dynamically configured management entity. In this manner, the management entity utilized by a host managed system may be dynamically changed over time to meet the needs of users of the host managed system.

Host manifest 167 may be implemented with one or more data structures that store information regarding hardware resources of a host managed system. The information may include, for example, a list of hardware devices, the type of each hardware device, capabilities of each hardware devices, and/or other information regarding the hardware resources of the host managed system. Host manifest 167 may be updated over time to ensure that it is likely to include accurate information.

Solution requirements repository 168 may be implemented with one or more data structures that store information regarding hardware resource requirements for any number of solutions (e.g., to which a host managed system may be subscribed). The information may include, for example, a list of solutions and corresponding hardware resources required for each of the solutions including, for example, list of hardware devices, the type of each hardware device, capabilities of each hardware device, and/or other information regarding the hardware resources that should be available for a solution to be implemented by a managed system.

Compatible solutions repository 169 may be implemented with one or more data structures that store information regarding solutions which a host managed system is likely to be able to implement. The information may include, for example, a list of identifiers of the solutions, identifiers of software stacks for each identified solution, information regarding where images of applications or other entities for the identified software stacks may be obtained, and/or other types of information usable to allow local subscription manager 158 to identify whether a solution is compatible with a host managed system and/or allow local subscription manager 158 to implement a solution (e.g., by automatically retrieving and deploying a software stack).

While various data structures have been illustrated in and described with respect to FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to local subscription manager 158 (e.g., in a storage of a deployment manager or subscription management service) in a manner that is still accessible to local subscription manager 158.

While illustrated in FIG. 1D with a limited number of specific components, a local subscription manager may include additional, fewer, and/or different components without departing from embodiments disclosed herein.

Figure 2:
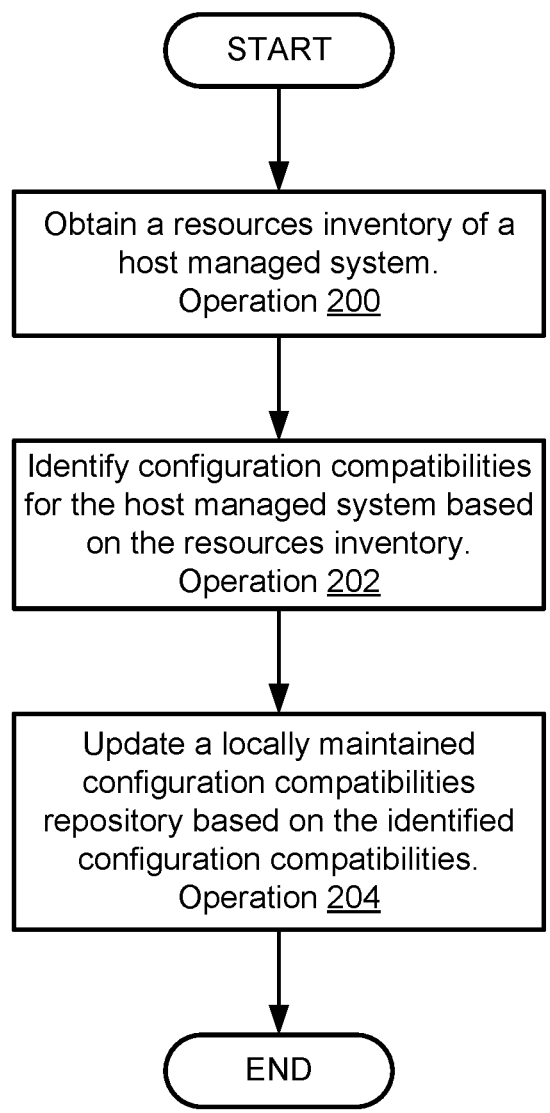
FIG. 2 shows a flow diagram illustrating a method of identifying managed system subscription compatibility in accordance with an embodiment.
Figure 3:
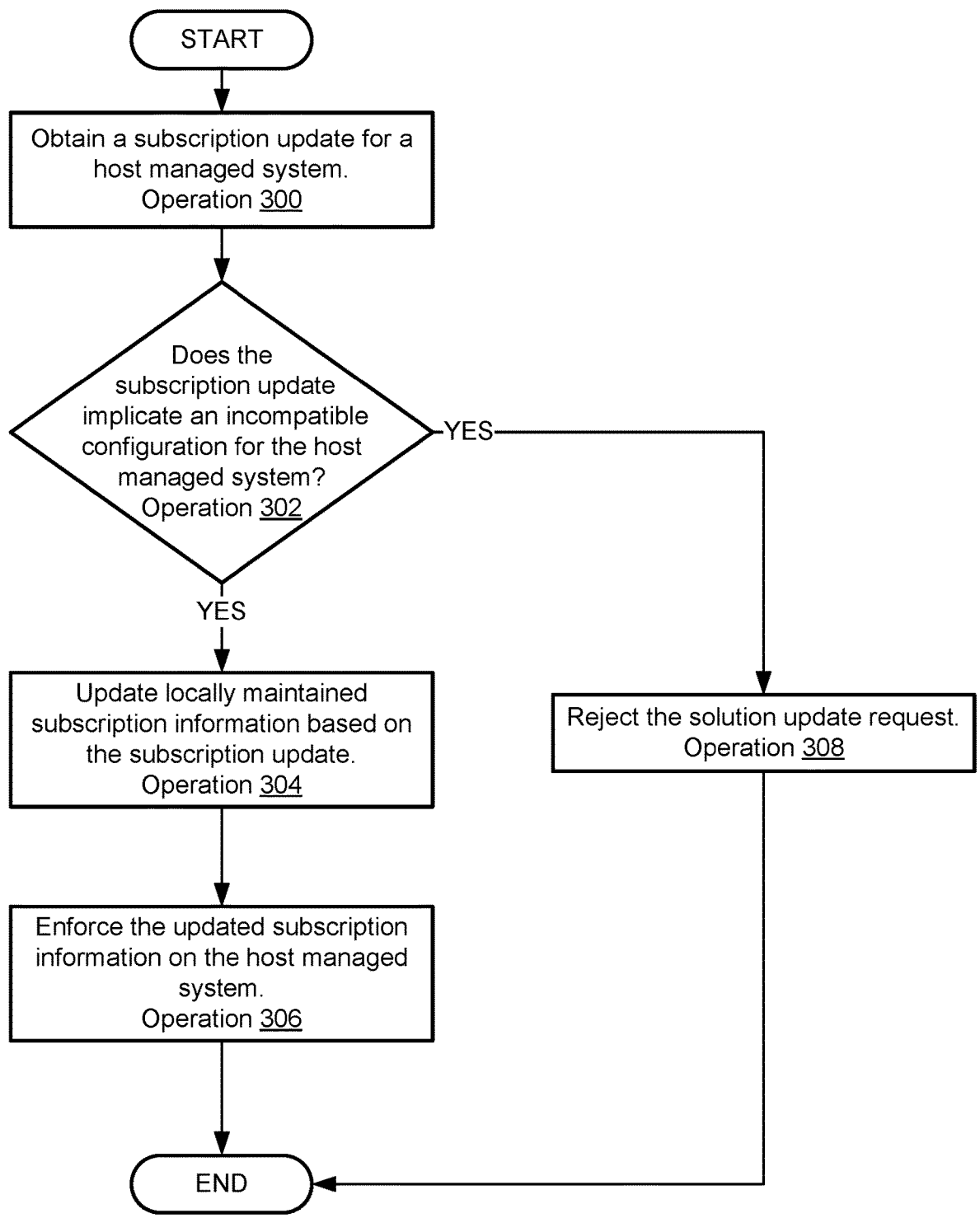
FIG. 3 shows a flow diagram illustrating a method of servicing subscription updates in accordance with an embodiment.

As discussed above, the components of FIG. 1A may perform various methods to provide computer implemented services using managed systems that may provide respective solutions limited based on the hardware resources of the respective managed systems. FIGS. 2-3 illustrate examples of methods that may be performed by the components of FIG. 1A. For example, a local subscription manager of a managed system, a deployment manager, and/or a subscription management service may perform all or a portion of the methods. In the diagrams discussed below and shown in FIGS. 2-3, any of the operations may be repeated, performed in different orders, and/or performed in parallel with or in a partially overlapping in time manner with other operations.

Turning to FIG. 2, a flow diagram illustrating a method of managing changes in managed system compatibilities in accordance with an embodiment is shown. The method illustrated in FIG. 2 may be performed when a startup or other type of initialization of a managed system is performed. For example, the method may be performed when a managed system is power cycled.

At operation 200, a resources inventory for a host managed system is obtained. The resources inventory may be obtained by a local subscription managed hosted by the managed system. The resources inventory may be obtained from a startup manager of the managed system. For example, the startup manager may perform a hardware inventory as part of starting up the host managed system.

In an embodiment, the resources inventory specifies (i) hardware components (all or a portion) of the host managed system, (ii) type information for the specified hardware components, (iii) capability information for the specified hardware components (e.g., how quickly data can be provided to or processed by hardware components), and/or (iv) other types of information usable to classify or characterize hardware components of a host managed system. The resources inventory may also specify the enablement state (e.g., whether usable or disabled due to lack of subscription for the components) for these hardware components.

The resources inventory may also include information regarding software components such as, for example, firmware hosted by hardware components, software stacks hosted by a managed system, etc.

In an embodiment, the resources inventory is obtained by sending a request, an interrupt, or other type of communication to the startup manager via an interconnect with which a local subscription manager is operably connected to one or more processors executing instructions (e.g., computer instructions) corresponding to the startup entity. The startup entity may provide the resources inventory and/or information usable by the local subscription manager to obtain the resources inventory. The resources inventory may also be obtained by sending a request to an operation manager which manages various software stacks. The operation manager may provide information regarding these components.

At operation 202, configuration compatibility for the managed system is identified based on the resources inventory. The configuration compatibilities may be identified by matching the resources inventory to hardware resources for various solutions (e.g., which may be stored in a solutions requirements repository 168) to identify all of the solutions that may be implemented with the managed system (e.g., based on its actual capabilities).

At operation 204, a locally maintained configuration compatibilities repository is updated based on the identified configuration compatibilities. For example, the repository may be updated to indicate that the host managed system is compatible with the solutions identified in operation 202.

In an embodiment, the locally maintained configuration compatibilities repository is implemented with a lookup data structure include any number of entries. Any of the entries may correspond to a particular solution. The entries of the lookup data structure may be populated with matching information (e.g., identifiers) of the solutions identified in operation 202. Consequently, when a lookup if performed using an identifier of a solution as a key, an entry may be identified via the lookup if the solution is compatible with the hosted managed system. If no entries are identified, then the lookup may indicate that the solution is not compatible with the host managed system.

The method may end following operation 204.

Turning to FIG. 3, a flow diagram illustrating a method of servicing subscription updates in accordance with an embodiment is shown. The method illustrated in FIG. 3 may be performed by a local subscription manager of a host managed system.

At operation 300, a subscription update for the host managed system is obtained. The subscription may be obtained from, for example, a subscription management service or a deployment manager. The subscription update request may specify one or more changes (e.g., new, modified) to subscriptions for the host managed system. For example, the subscription update may specify any number of enablement and/or disablement operations to be performed, limitations on the subscriptions, etc.

At operation 302, a determination is made regarding whether the subscription update implicates an incompatible configuration for the host managed system. The determination may be made by attempting to match identifiers of the one or more subscriptions to entries of a lookup data structures that specifies solutions compatible with the host managed system. If any of the identifiers of the subscriptions do not match any entry, then it may be determined that the subscription update implicates an incompatible configuration for the host managed system. The determination may be made via other methods without departing from embodiments disclosed herein.

If it is determined that the subscription update implicates an incompatible configuration, then the method may proceed to operation 308. Otherwise, the method may proceed to operation 304 following operation 302.

At operation 304, locally maintained subscription information is updated based on the subscription update. For example, the changes in subscription may be recorded with the local subscription manager by modifying a subscription information repository which may specify the subscriptions for the host managed system.

At operation 306, the updated subscription information is enforced on the host managed system. The updated subscription information may be enforced by performing enablement and/or disablement actions, which may be specified by the subscription update. The actions may be performed by pushing corresponding code blocks to the host managed system for execution. Execution of the pushed code blocks may cause the host managed system to perform the enablement disablement actions. The enablement/disablement actions may include enabling any number of disabled hardware components, disabling any number of enabled hardware components, enabling/disabling/replacing/reconfiguring any number of software components such as startup managers, operation managers, applications, etc., and/or configuring any number of the hardware components of the host managed system.

The method may end following operation 306.

Returning to operation 302, the method may proceed to operation 308 following operation 302 when the subscription update implicates an incompatible configuration for the host managed system.

At operation 308, the subscription update is rejected. The subscription update may be rejected by discarding it without recording the subscription changes specified or performing enablement/disablement action specified by the subscription update.

Additionally, information regarding the rejection of the subscription update may be provided to a subscription management service or other entity. The information may indicate why the subscription update was rejected. By providing this information, the subscription management service may be prompted to automatically find alternative means for implementing a subscription change which it previously received that prompted it to provide the subscription update. For example, the subscription management service may attempt to reconfigure other managed systems, may look for alternative subscriptions which may be compatible with the host managed system, and/or may perform other actions to ensure that changes in subscription are serviced.

The method may end following operation 308.

Thus, via the methods illustrated in FIGS. 2-3, a distributed system may be made more likely to only attempt to enforce compatible configurations on managed systems. Consequently, the distributed system may be more likely to provide desired computer implemented services.

Figure 4A:
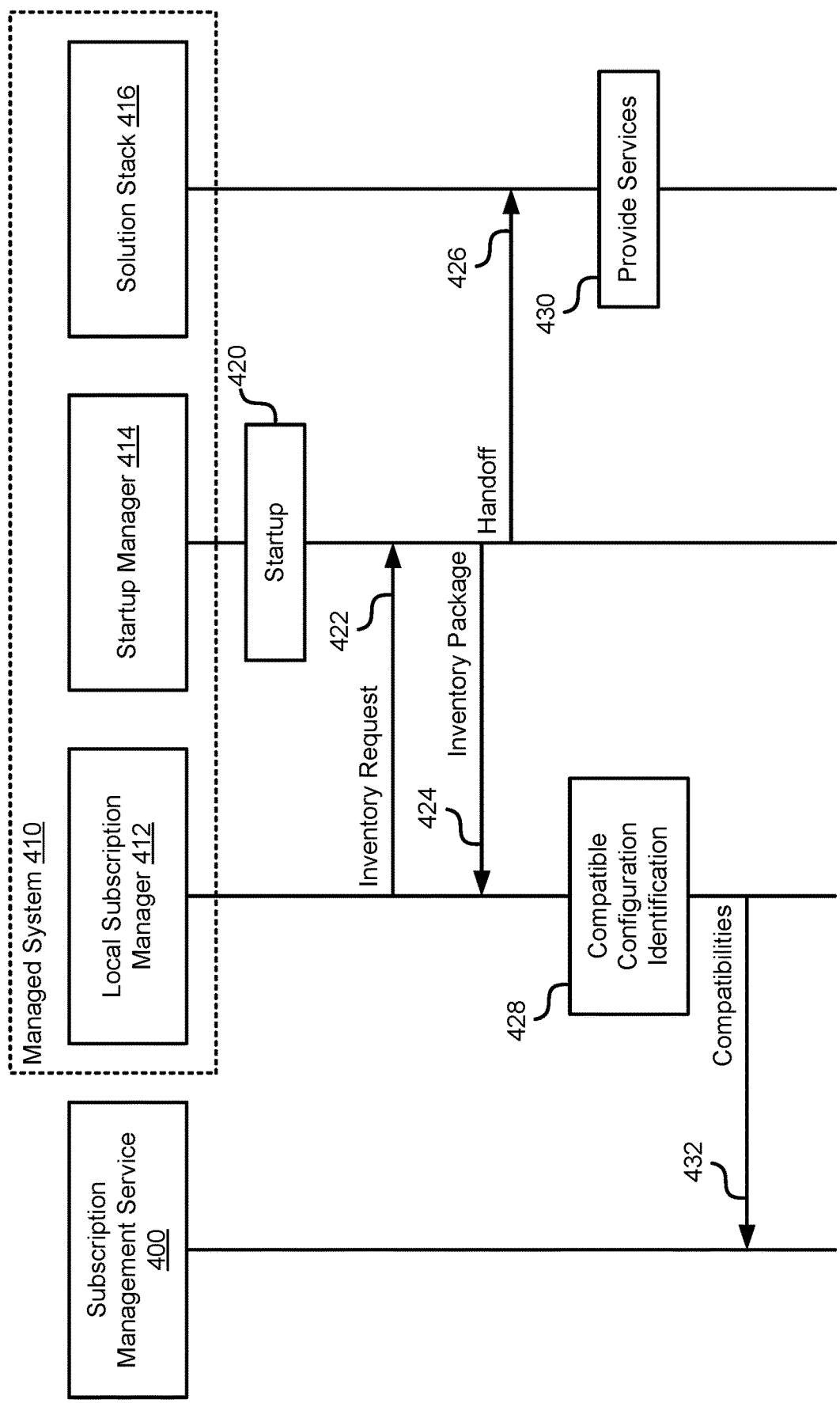
FIGS. 4A-4C show diagrams illustrating interactions between and actions of components of a system in accordance with an embodiment.
Figure 4B:
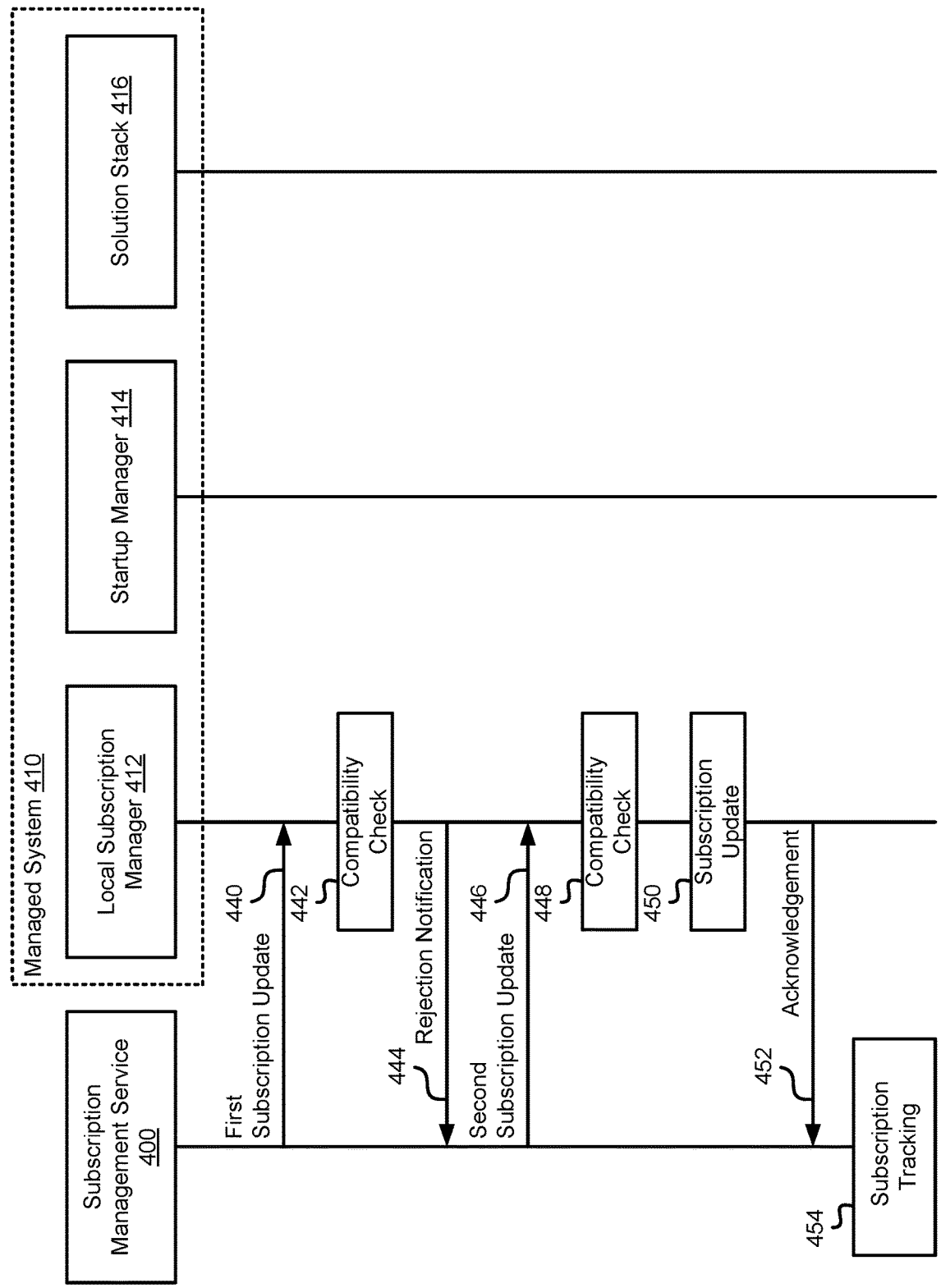
Figure 4C:
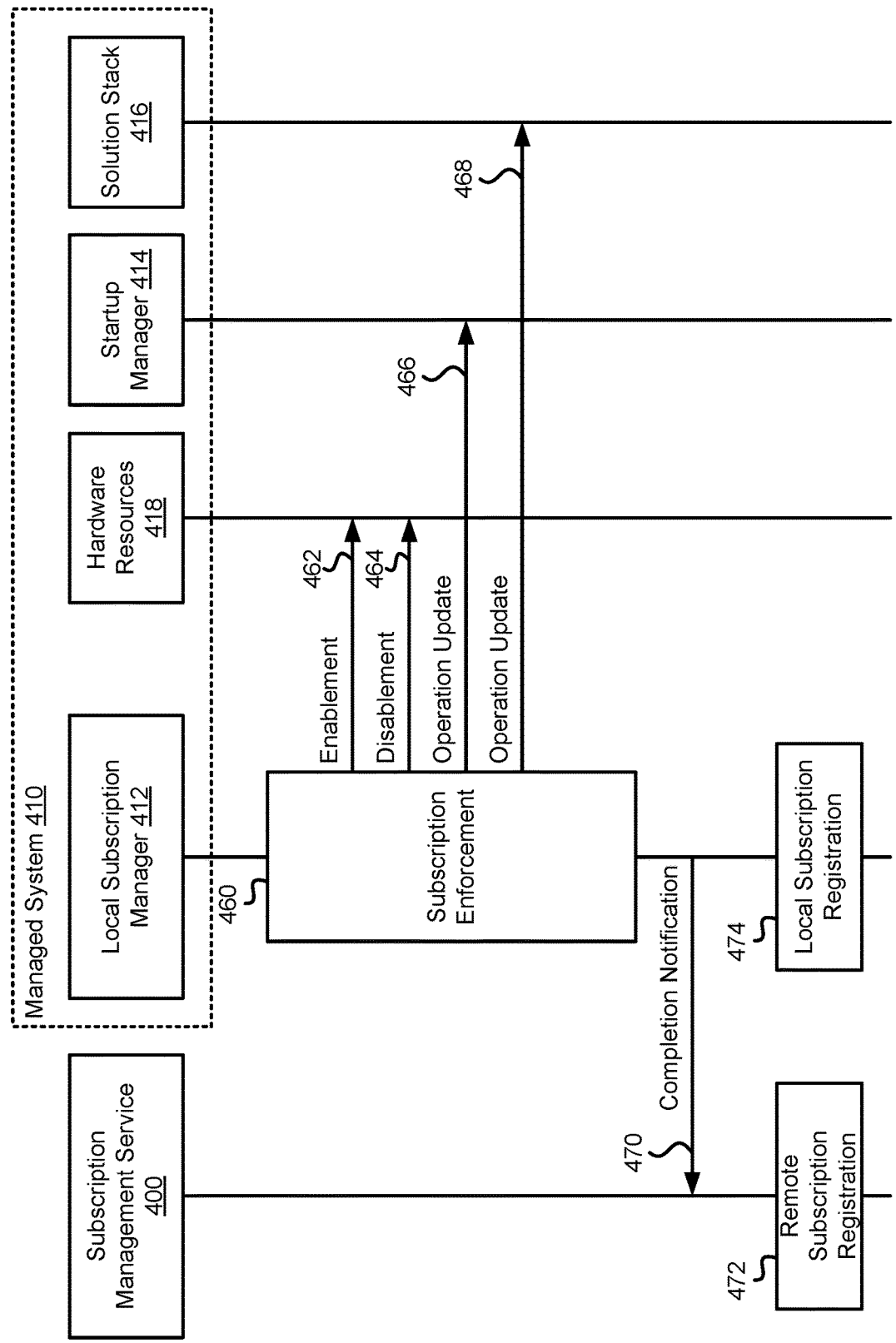

Turning to FIGS. 4A-4C, interaction diagrams in accordance with an embodiment are shown. In these figures, a system similar to that illustrated in FIG. 1A may be operating. In these figures, operations performed by the respective components are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

Turning to FIG. 4A, consider a scenario where managed system 410 begins, at block 420, to perform a startup. The startup may be performed to place managed system 410 in a predetermined operating state. Subscription management service 400 may manage managed system 410 such that it enters the predetermined operating state in which it is likely to be able to provide desired computer implemented services with solution stack 416.

At block 422, local subscription manager hosted by managed system 410 identifies the startup and sends an inventory request to startup manager 414. As part of the startup, startup manager 414 may perform a resource inventory of managed system 410 through which it may identify the available (e.g., enabled) hardware components of managed system 410.

At block 424, in response to the request, startup manager 414 provide an inventory package to local subscription manager 412. The inventory package includes information regarding the enabled hardware components.

Using the inventory data package, at block 428, local subscription manager performs a compatible configuration identifier for managed system 410 to identify the subscriptions that are compatible with managed system 410. Local subscription manager 412 may locally record the solution compatibilities and, at block 432, notify subscription management service 400 regarding the solution compatibilities.

While, before, or after any of blocks 424, 428, and 432 are performed, at block 426, startup manager 414 may complete the startup and perform a handoff of operational management of managed system 410 such that the operation manager and/or applications of solution stack 416 being operation. Startup manager 414 may suspend or terminate its operation after the handoff.

At block 430, solution stack 416 begins to provide services, which may be computer implemented services provided to users of and/or devices operably connected to managed system 410.

Turning to FIG. 4B, now consider a scenario where, over time and by virtue of the distributed nature of subscription management service 400 and managed system 410, subscription management service 400 begins to make subscription change decisions for managed system 410 based on inaccurate information (e.g., listing of hardware components of managed system 410 that inaccurately reflect the actual hardware components of managed system 410.

In response to change in subscription to a solution for managed system 410, subscription management service 400, at block 440, generates and sends a first subscription update to local subscription manager 412. However, the first subscription update implicates use of a graphics processing unit and which managed system 410 does not have access (e.g., does not include by virtue of its previous removal or disablement). In response to the update, at block 442, local subscription manager 412 performs a compatibility check for the first subscription update and identifies that the subscription indicated by the subscription update is incompatible with managed system 410.

In response to the determination, at block 444, local subscription manager 412 sends a rejection notification to subscription management service 400 and indicates that the graphics processing unit is unavailable, therefore, the first subscription update is incompatible with managed system 410.

Based on the rejection notification, at block 446, subscription management service 400 identifies a different type of subscription for managed system 410, which does not require use of a graphics processing unit, and sends a second subscription update to local subscription manager 412 indicating that managed system 410 is to be subscribed to the different type of subscription.

In response to receiving the second subscription update, at block 448, local subscription manager 412 performs a compatibility check for the different type of subscription and identifies that it is compatible with managed system 410. Based on the determination, at block 450, local subscription manager 412 performs a subscription update to indicate that managed system 410 is now subscribed to the different type of subscription. At block 452 and based on the subscription update, local subscription manager 412 sends an acknowledgement indicating that the subscription of the second subscription update will be implemented but is not yet implemented. The acknowledgement prompts, at block 454, subscription management service 400 to initiate subscription tracking for the different type of subscription for managed system 410.

Turning to FIG. 4C, at block 460, local subscription manager 412 performs subscription enforcement based on the subscription update. The subscription enforcement modifies operation of managed system 410 such that it operates in accordance with the different type of subscription. To do so, at blocks 462 and 464, local subscription manager 412 performs enablement and disablements of various hardware components of hardware resources 418 by, for example, powering and/or depowering the various hardware components. The powered/depowered components may be specified by the different type of subscription.

Additionally, at blocks 466 and 468, local subscription manager 412 may perform operation updates for startup manager 414 and solution stack 416. To do so, local subscription manager 412 may push enablement code blocks specified by the different type of subscription to managed system 410 for execution, which may result in the operation updates for startup manager 414 and solution stack 416.

After completion of the subscription enforcement, at block 470, local subscription manager 412 may send a completion notification to subscription management service 400. In response, at block 472, subscription management service may perform a remote subscription registration for the different type of subscription and terminate the subscription tracking. The remotely registered subscription may indicate that managed system 410 is now operating in accordance with the different type of subscription.

At block 474, local subscription manager 412 may also perform a local subscription registration for the different type of subscription. By doing so, the local subscription manager 412 may be empowered to independently enforce various limitations regarding the subscription. For example, the locally registered subscriptions may include or otherwise indicate various disablement actions to disable the different type of subscriptions, should the limitations on the different type of subscription be exceeded.

Thus, via the processes illustrated in FIGS. 4A-4C, embodiments disclosed herein may provide for the automated and distributed limitation of configuration of various managed systems in a distributed system. By doing so, inaccurate information in the distributed system may be less likely to negatively impact the computer implemented services provided by the distributed system.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of managed systems if the control layer for the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control plane used to manage the configuration of the distributed system may be far more resilient to malicious attacks.

Accordingly, embodiments disclosed herein may be provide for the improved operation of distributed system by improving resilience to malware or other types of third party attacks while still providing for configurability over time such that various types of desired solutions may be provided over time.

As discussed above, various components may be implemented with computing devices. For example, any of the components illustrated in FIGS. 1A-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for managing computer implemented services provided by a managed system, the method comprising:
   obtaining, by a local subscription manager of the managed system, a subscription update for the managed system, the subscription update specifying a change in subscription for the managed system;
   making a determination, by the local subscription manager, that the subscription update implicates an incompatible configuration for the managed system, the incompatible configuration requiring a function which the managed system is unable to provide; and
   in response to the determination:
      rejecting, by the local subscription manager, the subscription update for the managed system to maintain a current configuration of the managed system,
   wherein the local subscription manager comprises an out of band manager hosted by the managed system and that operates independently from the managed system.

2. The computer-implemented method of claim 1, wherein making the determination comprises:
   performing a lookup in a configurations compatibility repository using one or more subscriptions specified in the subscription updates as keys to identify that at least one of the one or more subscriptions is not associated with any compatible configuration specified by the configurations compatibility repository.

3. The computer-implemented method of claim 2, wherein the configuration compatibility repository comprises a list, the list comprising a number of entries with each entry of the number of entries being associated with a corresponding subscription, and the lookup being performed by attempting to match the one or more subscriptions to the corresponding subscription of each of the number of entries.

4. The computer-implemented method of claim 3, wherein the entries of the number of entries of the list are based on hardware resources of the managed system, the hardware resources limiting subscriptions which may be implemented with the managed system.

5. The computer-implemented method of claim 1, further comprising:
   obtaining, by the local subscription manager, a second subscription update for the managed system, the second subscription update specifying a second change in subscription for the managed system;

making a second determination, by the local subscription manager, that the second subscription update implicates a compatible configuration for the managed system;
in response to the determination:
updating, by the locally subscription manager, locally maintained subscription information based on the subscription update; and
enforcing, by the local subscription manager, the updated locally maintained subscription information on the managed system.

6. The computer-implemented method of claim 5, wherein enforcing the updated locally maintained subscription information on the managed system comprises:
disabling a portion of hardware resources of the managed system that are enabled.

7. The computer-implemented method of claim 5, wherein enforcing the updated locally maintained subscription information on the managed system comprises:
enabling a portion of hardware resources of the managed system that are disabled.

8. The computer-implemented method of claim 5, wherein enforcing the updated locally maintained subscription information on the managed system comprises:
updating operation of a startup manager hosted by the managed system;
updating operation of an operation manager hosted by the managed system; and/or
updating operation of a software stack hosted by the managed system.

9. The computer-implemented method of claim 1, wherein the determination is made, at least in part, on a portion of hardware resources of the managed system that will be disabled if the one or more subscriptions are implemented by the managed system.

10. The computer-implemented method of claim 1, wherein the determination is made, at least in part, on a software stack functionality of the managed system that will be unavailable if the one or more subscriptions are implemented by the managed system.

11. The computer-implemented method of claim 1, wherein the local subscription manager makes the determination while unable to communicate with other components of a distributed control plane for the managed system.

12. The computer-implemented method of claim 1, wherein the local subscription manager present itself as a separate device from the managed system.

13. The computer-implemented method of claim 1, wherein the local subscription manager is associated with a network endpoint different from a second network endpoint associated with the managed system.

14. A non-transitory machine-readable medium having instructions stored therein, which when executed by a processor, cause the processor to perform operations for managing computer implemented services provided by a managed system, the operations comprising:
obtaining, by a local subscription manager of the managed system, a subscription update for the managed system, the subscription update specifying a change in subscription for the managed system;
making a determination, by the local subscription manager, that the subscription update implicates an incompatible configuration for the managed system, the incompatible configuration requiring a function which the managed system is unable to provide; and
in response to the determination:
rejecting, by the local subscription manager, the subscription update for the managed system to maintain a current configuration of the managed system,
wherein the local subscription manager comprises an out of band manager hosted by the managed system and that operates independently from the managed system.

15. The non-transitory machine-readable medium of claim 14, wherein the operations further comprise:
obtaining, by the local subscription manager, a second subscription update for the managed system, the second subscription update specifying a second change in subscription for the managed system;
making a second determination, by the local subscription manager, that the second subscription update implicates a compatible configuration for the managed system;
in response to the determination:
updating, by the locally subscription manager, locally maintained subscription information based on the subscription update; and
enforcing, by the local subscription manager, the updated locally maintained subscription information on the managed system.

16. The non-transitory machine-readable medium of claim 15, wherein enforcing the updated locally maintained subscription information on the managed system comprises:
disabling a portion of hardware resources of the managed system that are enabled.

17. A managed system, comprising:
a processor; and
a local subscription manager adapted to perform operations for managing computer implemented services provided by a managed system, the operations comprising:
obtaining, by a local subscription manager of the managed system, a subscription update for the managed system, the subscription update specifying a change in subscription for the managed system;
making a determination, by the local subscription manager, that the subscription update implicates an incompatible configuration for the managed system, the incompatible configuration requiring a function which the managed system is unable to provide; and
in response to the determination:
rejecting, by the local subscription manager, the subscription update for the managed system to maintain a current configuration of the managed system,
wherein the local subscription manager comprises an out of band manager hosted by the managed system and that operates independently from the managed system.

18. The managed system of claim 17, wherein the operations further comprise:
obtaining, by the local subscription manager, a second subscription update for the managed system, the second subscription update specifying a second change in subscription for the managed system;
making a second determination, by the local subscription manager, that the second subscription update implicates a compatible configuration for the managed system;
in response to the determination:
updating, by the locally subscription manager, locally maintained subscription information based on the subscription update; and enforcing, by the local subscription manager, the updated locally maintained subscription information on the managed system.

19. The managed system of claim 18, wherein enforcing the updated locally maintained subscription information on the managed system comprises:
   disabling a portion of hardware resources of the managed system that are enabled.

20. The managed system of claim 17, wherein the determination is made, at least in part, on a software stack functionality of the managed system that will be unavailable if the one or more subscriptions are implemented by the managed system.

* * * * *